United States Patent [19]

Holmberg

[11] 4,317,046

[45] Feb. 23, 1982

[54] ENERGY PRODUCING APPARATUS AND METHOD

[76] Inventor: Richard Holmberg, c/o Scientific Dye Works, 114 Troutman St., Brooklyn, N.Y. 11206

[21] Appl. No.: 213,246

[22] Filed: Dec. 4, 1980

[51] Int. Cl.³ .................... F01D 15/10; F03C 2/00
[52] U.S. Cl. .................. 290/1 R; 60/496; 60/639; 204/DIG. 6; 290/52
[58] Field of Search ............ 290/1 R; 60/639, 496; 416/84; 60/531, 675, 671, 721; 204/129, 270, 278, DIG. 6

[56] References Cited

U.S. PATENT DOCUMENTS 3,520,137  7/1970  Newman et al. ............... 204/129
4,051,678  10/1977  Yates ............................ 60/531

Primary Examiner—J. V. Truhe
Assistant Examiner—Shelley Wade
Attorney, Agent, or Firm—Arthur A. March

[57] ABSTRACT

Energy producing apparatus comprising an imbalance wheel mounted for energy producing rotation about a substantially horizontal axis, and which is substantially in rotational balance and defines at least two peripherally located and substantially equally circumferentially distributed electrochemical cell zones for conversion of liquid to gas, each zone having operatively opposed cathode and anode devices and operatively disposed imbalance imparting captive gas collection spaces for collecting corresponding conversion gas therein, plus a liquid feed system for feeding liquid to the zones, electrical conductor devices arranged for selectively providing a circuit of current from a source to the corresponding cathode and anode devices of each successive zone when at a selective imbalance imparting lower location in the lower half wheel portion, and a gas delivery system arranged for delivering conversion gas from the corresponding collection space of each successive zone when at the substantially uppermost location in the upper half wheel portion for recovery therefrom, whereby successively at such lower location to convert liquid to gas in each zone and collect the gas in the corresponding collection space thereof, and thereby displace a concordant volume of liquid therefrom and decrease the weight of the adjacent portion of the wheel thereat in relation to the remainder thereof, for creating an imbalance in the wheel sufficient for energy producing rotation thereof in addition to delivery of conversion gas via the delivery system for recovery, and method of operating such apparatus for producing rotational energy and gas such as by electrolysis of water.

27 Claims, 7 Drawing Figures

ENERGY PRODUCING APPARATUS AND METHOD

The present invention relates to an energy producing apparatus and method, and more particularly to such an apparatus comprising an imbalance wheel or the like rotatable about a substantially horizontal axis and in which electrochemical conversion of liquid to gas in a lower location thereof is selectively successively carried out for creating an imbalance in the wheel sufficient for energy producing rotation thereof in addition to recovery of the conversion gas so produced, as well as to a method of operating such apparatus.

Rotatable imbalance wheel arrangements are known, but these typically involve mechanical, pressure and/or heat, e.g. solar heat, influencing changes in the balance of, e.g. volatile, liquid portions distributed in the wheel to cause rotation thereof for production of energy such as in the form of rotary mechanical power. In this regard, see U.S. Pat. Nos. 3,659,416 (Brown); 2,597,890 (Monk); 3,984,985 (Lapeyre); 4,012,911 (Gulko); 4,051,678 (Yates); 3,941,030 (Massung); 3,509,716 (Avery); and 4,074,534 (Morgan).

Electrochemical cell arrangements are also known in which liquid is electrochemically converted into decomposition products including gases, such as hydrogen which forms at the cathode and oxygen which forms at the anode in the case of the electrolysis of water in the presence of an electrolyte. These arrangements are normally provided in a stationary installation. In this regard, see U.S. Pat. Nos. 3,755,128 (Herwig); 3,459,953 (Hughes); and 4,011,148 (Goudal).

Further energy conversion systems are also known including turbine arrangements, driven by hydrogen and oxygen combustion energy, derived from solar energy or wind energy operated dissociation of water into precursor hydrogen and oxygen as combustion energy sources, so as to generate steam; or driven by solar or other waste heat source to generate electrical energy; or driven by any appropriate source for other rotary mechanical energy purposes. However, these energy conversion systems are generally complicated and expensive in design and operation. In this regard, see respectively U.S. Pat. Nos. 4,087,974 (Vaughan); 3,990,245 (Heilemann); and 4,120,157 (Tang).

It is among the objects and advantages of the present invention to overcome drawbacks and deficiencies previously encountered in the prior art, and to provide an energy producing apparatus and conjoint method, in which electrochemical conversion of liquid to gas is carried out for production of rotary mechanical power in addition to production and recovery of the gas so produced, and especially such an apparatus in the form of an imbalance wheel rotatable about a substantially horizontal axis and defining at least two peripherally located and substantially equally circumferentially distributed electrochemical cell zones for such purposes.

It is among the additional objects and advantages of the present invention to provide an apparatus of the foregoing type in which cheap electrical power from any source, such as a solar energy derived source, may be used in the conjoint method of use thereof so operate the electrochemical conversion in the apparatus, and in which the quantity of electrical power so used is more than offset by the quantity of corresponding energy in the form of recoverable heat, rotary mechanical power and conversion gas obtained from the overall operation than otherwise, and optionally which energy in turn may be concordantly reconverted into electrical power.

It is among the further objects and advantages of the present invention to provide such an apparatus which is simple in design and construction, easy and inexpensive to produce from readily available materials, durable and robust in use, requiring a minimum of operating parts, readily repaired and maintained, operated with little on-going attention, and resulting in essentially only pure and valuable gaseous end products, i.e. of the operation of the method in the apparatus, corresponding to the precursor feed liquid such as water as the only ingredient essentially consumed in the operation along with the power used to affect the electrochemical conversion.

Other and further objects and advantages of the present invention will become apparent from a study of the within specification and accompanying drawings, in which:

In accordance with one main aspect of the present invention, an energy producing apparatus is advantageously provided which in short, in accordance with its conjoint method of operation, electrochemically produces gas in situ from a liquid in an imbalance rotation imparting fluid sealed system for providing rotary mechanical power as well as recoverable valuable gas.

The energy producing apparatus generally comprises an imbalance wheel or the like which is adapted to be mounted for energy producing rotation about a substantially horizontal axis to provide a lower half wheel portion below such axis and an upper half wheel portion above such axis, the wheel being substantially in rotational balance and defining at least two peripherally located and substantially equally circumferentially distributed electrochemical cell zones for conversion of liquid to gas, each zone having operatively opposed cathode means and anode means and operatively disposed imbalance imparting captive gas collection space means for collecting corresponding conversion gas therein.

Also contemplated are liquid feed means for feeding liquid to the zones, electrical conductor means arranged for selectively providing a circuit of current from a source to the corresponding cathode means and anode means of each successive zone when at a selective imbalance imparting lower location in the lower half wheel portion, and gas delivery means arranged for delivering conversion gas from the corresponding collection space means of each successive zone when at the substantially uppermost or neutral location in the upper half wheel portion for recovery therefrom.

By way of such arrangement, advantageously, it is possible successively at such lower location to convert liquid to gas in each zone and collect the gas in the collection space means thereof, and thereby displace a concordant volume of liquid therefrom and decrease the weight of the adjacent portion of the wheel thereat in relation to the remainder thereof, for creating an imbalance in the wheel sufficient for energy producing rotation thereof in addition to delivery of conversion gas via the delivery means for recovery.

More particularly, the gas delivery means desirably include valve means operable for delivering gas from the corresponding collection space means only when the corresponding zone is at the uppermost location. Similarly, the corresponding collection space means desirably include baffle means operatively arranged for transmitting resultant gas lift thrust or torque of conversion gas thereagainst when at the lower location for rotation of the wheel to the uppermost location, i.e. in always the same direction of rotation.

Where gas is appropriately generated at both of the electrodes of the zone as in the case of electrolysis of water in the presence of an electrolyte, i.e. conversion to hydrogen gas at the cathode means and to oxygen at the anode means in the stoichiometrical volume ratio of two volumes of hydrogen to one volume of oxygen per quantity of water electrolyzed at given temperature and pressure, liquid permeable gas separating diaphragm means or membrane means are favorably provided and concordantly positioned in each zone for separating the gas collection space means into a cathode gas collection space adjacent the cathode means and an anode gas collection space adjacent the anode means. This will effectively operatively prevent mixing of the two gases and permit their individual recovery from the apparatus.

Preferably, the wheel may be suitably operatively provided with armature coil means substantially in rotational balance thereon for generating electric current directly during rotation of the wheel.

In accordance with one particular feature of the present invention, the wheel includes enclosed chamber means having a central hub and a peripherally located annular tubular portion outwardly spaced from the hub and containing the zones. Preferably, the hub is hollow, and the liquid feed means are flow connected with the hub while the hub is in common flow connection with each of the zones, such that the zones are in flow connection with each other only through the hub.

In accordance with another particular yet alternative feature of the present invention, the wheel includes enclosed chamber means in the form of a hollow drum peripherally containing the zones.

Suitably, two zones are provided in substantially diametrically opposed and rotationally balanced disposition in accordance with one embodiment of the present invention, whereas at least three zones are provided in substantially equally circumferentially distributed and rotationally balanced disposition in accordance with an alternative embodiment of the invention.

In connection with further features of the present invention, the wheel is carried on a shaft for rotation about such horizontal axis, gas recovery means are operatively provided adjacent the wheel for recovering conversion gas from the gas delivery means, and liquid reservoir means are operatively provided adjacent the wheel for supplying liquid to the liquid feed means.

Preferably, the wheel shaft is hollow, the gas recovery means include end means extending therethrough, and the gas recovery end means are operatively flow connected with the gas delivery means via rotary gas flow coupling means concentric with the shaft. Moreover, conveniently the hollow shaft has an end portion which forms an end portion of the liquid feed means, and the liquid feed means are operatively flow connected with the liquid reservoir via rotary liquid flow coupling means on the shaft end portion.

Significantly, the liquid reservoir is provided with liquid level flow adjustment means for maintaining the liquid level in the reservoir substantially equal to the height of the uppermost location in the upper half wheel portion of the wheel, and the liquid feed means are in desirable open flow communication with the liquid reservoir. Accordingly, the reservoir serves as an operative expansion chamber for liquid in the wheel as when liquid is temporarily outwardly displaced therefrom through the liquid feed means during successive electrochemical conversion of liquid to gas in a given zone.

Furthermore, the gas recovery means may include end means extending through the hollow shaft, and the gas recovery end means may be suitably operatively flow connected with the gas delivery means via rotary gas flow coupling means concentric with the shaft and including a rotary gas flow coupling arrangement adjacent to the rotary liquid flow coupling means.

With respect to a particular feature of the present invention, for instance applicable to an electrolysis cell zone arrangement in which different gases are formed from the liquid at the cathode and anode surfaces of the corresponding opposed electrode means, such liquid permeable and gas separating diaphragm means or membrane means are provided in each zone for separating the gas collection space means into a cathode gas collection space adjacent the cathode means and an anode gas collection space adjacent the anode means.

Also, the gas delivery means include separate corresponding cathode gas delivery means and anode gas delivery means for each cell, and separate corresponding cathode gas valve means and anode gas valve means operable for delivering corresponding cathode gas and anode gas from the corresponding collection space only when the corresponding zone is at the uppermost location.

Conjointly, the gas recovery means include separate corresponding cathode gas recovery means and anode gas recovery means, and the cathode gas recovery means are operatively flow connected with the cathode gas delivery means and the anode gas recovery means are operatively flow connected with the anode gas delivery means.

In turn, by preferably providing the shaft as a hollow shaft having opposed end portions mounted for rotation, one such end portion may desirably form an end portion of the liquid feed means, and the liquid feed means may be operatively flow connected with the liquid reservoir via the rotary liquid flow coupling means on the shaft end portion.

Hence, the cathode gas recovery means and anode gas recovery means may accordingly include corresponding end means respectively extending through the opposed end portions of the shaft, the end means of the cathode gas recovery means may be operatively flow connected with the cathode gas delivery means via rotary cathode gas flow coupling means concentric with the shaft, and the end means of the anode gas recovery means may be operatively flow connected with the anode gas delivery means via rotary anode gas flow coupling means likewise concentric with the shaft.

Thus, one of the rotary gas flow coupling means may be located conveniently adjacent to the rotary liquid flow coupling means and the other rotary gas flow coupling means may be located conveniently remote from such rotary liquid flow coupling means as at the opposite end portion of the shaft.

In connection with a further optional feature of the present invention, the wheel may be operatively provided with armature coil means circumferentially and substantially in rotational balance thereon. Correspondingly, field coil means may be operatively provided adjacent the wheel for induction coaction with the armature coil means for generating electric current directly during rotation of the wheel, along with current collection means such as a commutator and brushes for collecting the generated current.

Alternatively, the shaft may be operatively provided with such armature coil means substantially in rotational balance thereon, with such field coil means being operatively provided adjacent the shaft for such purposes, along with the current collection means.

Naturally, current supplying brush means are operatively provided adjacent the rotatably mounted wheel for selective successive conductive circuit connection with the electrical conductor means on the wheel for selectively providing current from a source to the opposed cathode means and anode means of each successive zone only when at the lower location.

Preferably, rechargeable power source means, e.g. one or more storage batteries, may be provided in operative circuit connection with the current supplying brush means for providing the necessary power for operating successively the electrochemical conversion in the corresponding zones. Desirably, the current collection means may be operatively connected with such rechargeable power source means for maintaining and replenishing at least in significant part the potential power thereof in terms of the generated current collected by the current collection means.

Likewise, such potential power of the rechargeable power source means may be additionally maintained and replenished at least in counterpart significant part by electrical energy derived from the recovered cathode gas and anode gas recombined for example in a fuel cell in conventional manner to produce further electrical energy. As the artisan will appreciate, where the liquid is water which is electrolyzed to hydrogen and oxygen, such hydrogen and oxygen upon recovery from the wheel may be recombined by electrochemical combustion in a fuel cell with the efficient production of readily reusable electrical energy.

In accordance with another main aspect of the present invention, a method of operating an energy producing apparatus of the instant type is also advantageously provided.

The method generally comprises selectively supplying current from a source to the opposed cathode means and anode means of each successive zone when at the selective lower location in the lower half wheel portion of the rotatably mounted wheel, electrochemically converting liquid such as water in the presence of an electrolyte, e.g. sulfuric acid, to gas in each such zone successively thereat and collecting the corresponding conversion gas in the corresponding collection space means thereof sufficiently for creating an imbalance in the wheel and for energy producing rotation of the wheel, and delivering conversion gas from the corresponding collection space means of each such successive zone when at the substantially uppermost location in the upper half wheel portion for recovery therefrom.

Favorably, the energy producing rotation of the wheel according to the instant method may be used directly to generate electric current and such generated current may be collected and recovered efficiently therefrom. Optionally, yet preferably, such recovered generated current may be used at least in part to supply current to the opposed cathode means and anode means of each successive zone when at the lower location, as noted above.

The conversion gas produced according to the method of operating the instant imbalance wheel apparatus may be advantageously recovered from the wheel as a valuable production product, or as also noted above such gas may be electrochemically combusted in appropriate cases for production of further electrical energy for use at least in part to supply current for the overall apparatus and method system.

In any case, as compared with the electrochemical conversion of liquid to gas in a conventional stationary installation, the corresponding electrochemical conversion carried out in the instant apparatus also produces rotational energy not otherwise obtained.

Referring to the drawing, and initially to FIGS. 1 and 2, an energy producing apparatus or system 1 is shown which includes an imbalance wheel 2 carried on a shaft 3 and mounted for energy producing rotation about a substantially horizontal axis A to provide a lower half wheel portion 4 below such axis and an upper half wheel portion 5 above such axis.

Shaft 3 may constitute a composite two part hollow shaft and comprise opposed sub-shaft portions 3a and 3b stationarily fixed to the corresponding opposed central end walls 6 and 7 of the wheel 2 concentric with axis A. Subshaft portions 3a and 3b are suitably rotatably mounted in opposed low friction bearings 8, 8 carried on upright stationary supports 9, 9.

It will be appreciated that the wheel 2 and all of its component parts and associated parts are constructed and arranged such that the entire rotating wheel system is substantially, and preferably essentially, in rotational balance.

The wheel 2 suitably defines at least two peripherally outwardly located and substantially equally circumferentially distributed electrochemical cell zones 10 for conversion of liquid to gas. Each zone 10 is provided with operatively opposed cathode means and anode means preferably having extremely high electrode surface area such as the corresponding cathode 11 and anode 12 as schematically shown, which are suitably fixedly mounted to the adjacent peripheral, e.g. cylindrical, outer wall 13 via the respective insulating holders 14 sealed against the outer wall 13 thereat.

Electrodes 11 and 12 may be conventional rod or plate electrodes, preferably plate electrodes, constructed from any appropriate material such as carbon, lead, nickel, silver, etc., especially where such material has been treated in conventional manner to provide an extremely high and electrochemically active, and preferably catalytically active, and especially highly porous, electrode surface area.

Holders 14 may be constructed from any appropriate material, preferably completely inert under the electrochemical conditions prevailing in the given cell zone 10, and electrically insulating in properties, such as ceramic material.

The peripheral, e.g. cylindrical, inner wall 15 is selectively spaced radially inwardly from outer wall 13, and together with the peripheral annular, e.g. constant radius, end walls 16, 17, specifically provide a peripherally located annular tubular portion 18 as the structure which defines the at least two peripherally located electrochemical cell zones 10.

Figure 2:
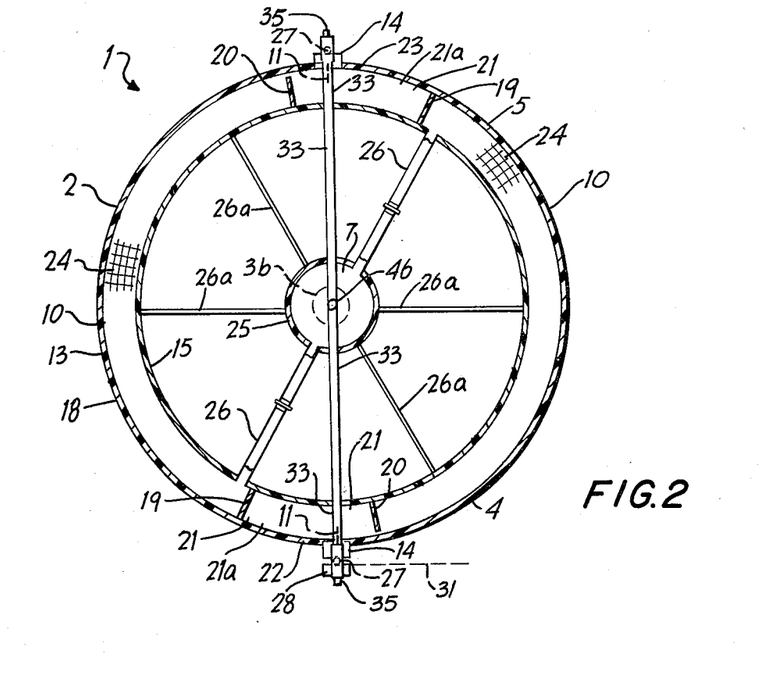
FIG. 2 is a schematic sectional view taken along the line 2—2 of FIG. 1.

These zones 10 are substantially equally circumferentially distributed within the annular tubular portion 18 by the correspondingly selectively disposed, e.g. radial, full wall dividers or closed dividers 19 concordantly provided (FIG. 2). Circumferentially spaced a selective rotational angular distance or arc distance from each such full wall divider 19 is a correspondingly disposed, e.g. radial, partial wall divider or limited liquid flow communication wall divider 20.

The full wall divider 19 and partial wall divider 20 of each zone 10, together with the adjacent opposed axial portions of the peripheral outer wall 13 and inner wall 15 thereat, plus the adjacent opposed angular arc portions of the annular end walls 16 and 17 therebetween, provide a corresponding operatively disposed imbalance imparting captive gas collection space means 21 for collecting corresponding conversion gas therein.

The corresponding collection space means 21 suitably include baffle means comprising mainly the appropriate adjacent portion of the peripheral inner wall 15 and the full wall divider 19, and progressively incrementally the appropriate adjacent portion of the peripheral outer wall 13, operatively arranged for transmitting resultant gas lift thrust or torque of conversion gas thereagainst when at a selective imbalance imparting lower location 22, preferably at the lowermost location, in the lower half wheel portion 4 for rotation of the wheel 2 to the uppermost or neutral location 23 in the upper half wheel portion 5 thereof (FIG. 2).

Liquid permeable gas separating diaphragm means or membrane means 24 of the conventional type are suitably provided in each zone 10 for separating the gas collection space means 21 into a cathode gas collection space 21a adjacent the cathode 11 and an anode gas collection space 21b adjacent the anode 12. Such diaphragm means 24 may be in the form of a partial annular, e.g. constant radius, wall member, conforming to the arcuate shape of the corresponding portion of the end walls 16, 17, and extending more or less parallel to such end walls and normal to the axis A between the radial confining limits of the spaced apart peripheral outer wall 13 and inner wall 15.

The diaphragm means 24 is suitably constructed in conventional manner from any appropriate material such as asbestos, polymer plastic, or the like. Such material suitably may be completely inert under the electrochemical conditions prevailing in the given cell zone 10, yet must permit liquid and/or ionic flow or exchange therethrough for appropriate electrochemical reaction as between the cathode and anode. At the same time, the diaphragm means 24 should be effective to prevent any significant gas flow therethrough under the prevailing electrochemical conditions so as to avoid mixing of the cathode gas and the anode gas.

The generally liquid saturated disposition of the diaphagm means, e.g. liquid permeable asbestos, will normally be sufficient to prevent any significant degree of gas flow therethrough under the contemplated operating conditions in each successive zone 10.

The diaphragm means 24 may be favorably structurally reinforced by sandwiching the same in each instance between, e.g. stainless steel or structurally rigid plastic, open pored netting or gauze or screening material or suitably sized perforated plate material.

The liquid feed means for feeding liquid to the zones 10 advantageously includes the hollow sub-shaft portion 3a flow communicating through the central end wall 6 with the hollow central hub 25 of the wheel 2, disposed axially between the end walls 6 and 7, and thence via one or more radial pipes 26 to each corresponding zone 10.

Thus, the liquid feed means, i.e. sub-shaft portion 3a, are flow connected with the hub 25 which is in turn in common flow connection with each of the zones 10 via the respective radial pipes 26. On the other hand, the individual zones 10 are in flow connection with each other only through the respective radial pipes 26 due to the presence of the full wall dividers 19 separating one zone 10 from the next successive zone 10 along the arcuate extent of the periphery of the wheel 2.

Of course, the opposite end wall 7 operatively completely closes off the corresponding end of hub 25 to prevent liquid flow communication therethrough to the hollow sub-shaft portion 3b.

In effect, the wheel 2 includes enclosed fluid sealed chamber means comprised of the central hub 25 and the peripherally located annular tubular portion 18 outwardly spaced therefrom and containing the zones 10. The radial pipes 26 conveniently serve as spokes to connect structurally the hub 25 and annular tubular portion 18 so as to form the wheel 2.

Preferably, the radial pipes 26 are in substantially diametrically opposed relation where two such pipes are provided at any given axial point, or are in substantially equally circumferentially distributed relation where more than two such pipes are so provided. A suitable number of properly weighted counter balancing structural spokes 26a are also preferably provided for interconnecting the hub 25 and annular tubular portion 18 and for distributing the overall weight of the rotatable system to achieve desired rotational balance thereof.

In any case, it will be noted that the pipes 26 and spokes 26a will be appropriately fashioned and distributed to provide structural interconnection between the hub 25 and annular tubular portion 18 and compensate for otherwise unevenness in the weight distribution about the wheel 2 thereby formed and in a manner achieving a rotationally balanced disposition of all of the parts relative to the axis of rotation A.

It will be appreciated, of course, that the hollow hub 25 may be provided of any suitable diameter and may even constitute a functional and structural extension of or part of the hollow shaft 3, as where hub 25 has the same outside diameter as shaft 3, and preferably also the same inside diameter as such shaft.

In this instance, the hollow sub-shaft portions 3a and 3b plus the hollow hub 25, having the same outside and inside diameters, will form a composite continuous one piece or integral hollow shaft 3, serving both as common shaft or axle for the wheel 2 rotatably mounted via the bearings 8 on the supports 9, and as a common liquid feed means axial pipe along with the at least two radial pipes 26 individually flow connecting the axial pipe concordantly with each of the correspondingly at least two zones 10.

In any case, whereas in such instance end wall 6 will be effectively omitted as unnecessary, the opposite end wall 7, although reduced in size commensurate with the diameter of such common shaft or axle, will normally remain to close off that end of the liquid feed means to prevent needless liquid flow communication therethrough to the hollow sub-shaft portion 3b therebeyond.

It will also be appreciated that but one radial pipe 26 need be provided to flow connect the liquid feed means with each individual zone 10, and that the remaining radial interconnections between the central hub 25, or the common composite shaft or axle composed of the sub-shaft portions 3a and 3b plus the hub when all are of the same radial size, on the one hand, and the peripherally located annular tubular portion 18, on the other hand, need only be in the form of an appropriate number of counterbalancing radial spokes 26a for the wheel 2.

Thus, all of the radial interconnections on the end portion of the wheel 2 adjacent the sub-shaft portion 3b may be in the form of such radial spokes 26a, since the radial pipes 26 on the end portion of the wheel adjacent to the subshaft portion 3a will be sufficient to supply the corresponding zones 10 with liquid. Because the corresponding diaphragm means 24 is suitably liquid permeable, the liquid will be adequately distributed therethrough to reach and occupy in balanced equilibrium the portion of the corresponding zone 10 on the side thereof remote from the particular radial pipe 26 in question.

On the other hand, as gas is generated in the particular zone 10 by electrochemical conversion of the liquid present, its presence will correspondingly displace a commensurate quantity or volume of liquid from the zone 10. Since the liquid in a given zone 10 will readily pass in either direction through the diaphragm means 24, the liquid displaced by the accumulating generated gas will eventually return in like amount from such zone 10 to the corresponding radial pipe 26 and thence to the hub 25 and sub-shaft portion 3a.

Moreover, it will be seen that since partial wall divider 20 provides for limited flow communication thereat, liquid may be readily adjusted and balanced as between the main portion of each zone 10 and the corresponding gas collection space means 21. This occurs where liquid is being displaced during electrochemical generation of gas at the lower location 22 and in turn where such liquid reoccupies the space previously occupied by the gas as when the gas is recovered from the corresponding zone when at the uppermost location 23 (FIG. 2).

Of course, the liquid flow entrance to the gas collection space means 21, e.g. at the gap between the free end of the partial wall divider 20 spaced radially inwardly from the outer wall 13, may be suitably provided optionally with similar liquid permeable gas separating diaphragm means or membrane means or other appropriate means to prevent escape of gas therepast to the remainder of the zone 10 therebeyond, as the artisan will appreciate.

Electrical conductor means such as in the form of individual externally exposed contact posts 27 are arranged in sealed condition in the corresponding holders 14 and in electrical conductive contact with the corresponding electrode in the adjacent zone 10. These contact posts 27 are arranged for selectively providing a circuit of current from an external source to the corresponding cathode 11 and anode 12 of each successive zone 10 when at the selective imbalance imparting lower location 22 in the lower half wheel portion 4.

In this regard, suitable current supplying brush means such as the individual resiliently mounted low friction brushes 28 are operatively provided on the stands 29 adjacent the periphery of the wheel 2 at the lower location 22 for selective successive circuit connection with the corresponding contact posts 27 on the wheel for selectively providing current from a source to the opposed cathode 11 and anode 12 of each successive zone 10 only when at the lower location.

For this purpose, a power source 30 such as a rechargeable battery of the conventional type may be provided in operative circuit connection via appropriate current lines 31 and 32 with the current supplying brushes 28 to supply direct current to the corresponding cathode 11 and anode 12 of each successive zone 10 when at the lower location 22.

Gas delivery means such as in the form of radially extending cathode gas pipes 33 and anode gas pipes 34 as corresponding cathode gas delivery means and anode gas delivery means are arranged in respective flow connection with the corresponding cathode gas collection space 21a and anode gas collection space 21b of each collection space means 21 of each zone 10 for delivering conversion gas therefrom when each successive zone is at the substantially uppermost location 23 in the upper half wheel portion 5 for recovery therefrom.

Included in such gas delivery means are appropriate valve means such as in the form of liquid operated or liquid sensitive corresponding valves 35 in the adjacent end portions of the appropriate cathode gas pipes 33 and anode gas pipes 34 flow communicating through the peripheral outer wall 13 with the corresponding cathode gas collection space 21a and anode gas collection space 21b thereat. Valves 35 are operable for delivering gas from the corresponding gas collection space means 21 only when the corresponding zone 10 is at the uppermost location 23.

Figure 4:
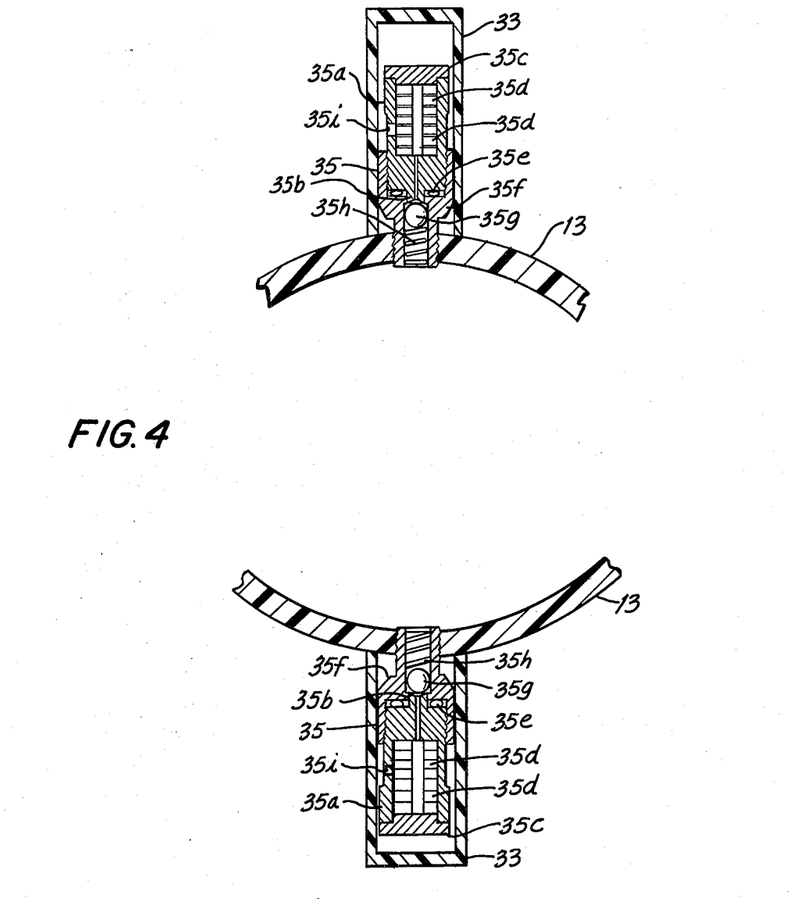
FIG. 4 is a schematic enlarged sectional partial view illustrating the operation of valve means for the gas delivery means for delivering conversion gas from the apparatus for recovery.

As shown in FIG. 4, valves 35 may each be provided in the form of a conventional hygroscopic air vent type valve, e.g. as used in home or office radiator containing heating systems (Sarco Company, Inc., Allentown, Pa.) Such valve is provided with a stack of hygroscopic fiber discs 35d within the bore of the upper or outer valve body 35a closed off by a valve cap 35c and screwed into the bore of the lower or inner valve base 35f, such that its body stem 35b having a constricted central bore and grooved bottom extends downwardly through the central opening of an interposed sealing gasket 35e and into contact with a base check ball 35g upwardly urged by a compression coil spring 35h in the lower or inner end portion of the bore of the valve base 35f.

The grooves in the bottom of the body stem 35b permit liquid or gas to pass around the top of the check ball 35g and into the central bore of the body stem 35b for contact with the hygroscopic fiber discs 35d. On contact with gas, e.g. hydrogen or oxygen, the hygroscopic fiber discs shrink and the gas is automatically vented through the spaces between the individual discs and out the body vents 35i in the side wall of the valve body 35a. On the other hand, on contact with liquid, e.g. water, the hygroscopic fiber discs expand and automatically prevent its flow through the body vents 35i.

Hence, when the corresponding valve 35 is at the lower location 22, it will be in contact with the liquid in the corresponding zone 10 thereat and prevent outflow therethrough to the gas delivery means. On the other hand, when such valve 35 reaches the uppermost location 23, it will be drained of liquid and instead be in contact with the collected conversion gas in the corresponding zone 10 thereat which will shrink the discs 35d and automatically vent such gas outwardly through the body vents 35i for passage through the radially extending gas delivery pipe 33 or 34, as the case may be.

Conveniently, the corresponding cathode delivery pipes 33 from the respective zones 10 terminate at a common cathode gas flow connection nipple joint 33a, and the corresponding anode gas delivery pipes 34 from the respective zones 10 likewise terminate at a common anode gas flow connection nipple joint 34a. Since the valves 35 remain closed when at any circumferential rotational angular position but that corresponding to the uppermost location 23, significantly no liquid will ever enter the cathode gas pipes 33 or the anode gas pipes 34.

The cathode gas joint 33a and anode gas joint 34a are conveniently positioned at the horizontal axis of rotation A such that their respective flow connection nipples 33b and 34b are operatively concentric to such axis.

It will be seen, therefore, that the energy producing apparatus 1 contemplates an imbalance wheel 2 rotatably mounted on shaft 3 and containing at least two electrochemical cell zones 10, each having a cathode 11 and anode 12 and imbalance imparting captive gas collection space means 21, plus liquid feed means including sub-shaft portion 3a, hub 25 and radial pipes 26, electrical conductor means including contact posts 27 arranged for selectively providing a circuit of current from a source 30 via brushes 28 to the corresponding cathode and anode of each successive zone 10 only when at the lower location 22, as well as gas delivery means including gas pipes 33 and 34 and valves 35 arranged for delivering conversion gas from the corresponding collection space means 21 of each successive zone 10 only when at the uppermost location 23 for recovery therefrom, whereby successively at such lower location 22 to convert liquid to gas in each zone 10 and collect the gas in the collection space means 21 thereof, and thereby displace a concordant volume of liquid therefrom and decrease the weight of the adjacent portion of the wheel 2 sufficient for energy producing rotation thereof in addition to delivery of conversion gas via the delivery means for recovery.

In this regard, advantageously gas recovery means are operatively provided adjacent the wheel 2 for recovering the conversion gas from the gas delivery means, and liquid reservoir means are also operatively provided adjacent the wheel for supplying liquid to the liquid feed means.

As to the liquid reservoir means, such may be provided in the form of a liquid reservoir 36 having liquid level flow adjustment means, e.g. a conventional float valve 37 or the like, for maintaining the liquid level L in the reservoir 36 substantially equal to the height H of the uppermost location 23 in the upper half wheel portion 5 of the wheel 2. Liquid from a source enters reservoir 36 via source pipe 38 controlled by float valve 37 which is adjustable to preselect the desired height L of the liquid.

Reservoir 36 is mounted on legs 39 so that its underside 36a is suitably above the horizontal axis of rotation A to permit the elbow liquid feed pipe 40 to be arranged with its horizontal stationary feed pipe end portion 41 concentrically aligned with the adjacent end portion 42 of the sub-shaft 3a along such axis. End portion 42 constitutes in effect the rotatable end portion of the liquid feed means of the wheel 2 and is in open flow communication with the liquid reservoir 36 via the low friction rotary liquid flow coupling means 43 (FIG. 5) on such end portion 42 and which couple the same with the horizontal stationary feed pipe end portion 41.

Thus, where liquid is displaced from a successive zone 10 when at the lower location 22 at which electrochemical generation of gas takes place, such liquid returns to reservoir 36 via radial pipe 26, hub 25, sub-shaft portion 3a and elbow pipe 40. In this respect, reservoir 36 conveniently serves the function of an expansion zone for the overall operation as well as an adjacent source of liquid to be fed to the wheel 2 for electrochemical consumption therein and for changing the rotational balance of the wheel for the desired purpose. For this reason, advantageously reservoir 36 is desirably maintained in free and open communication with the wheel 2 and the zones 10.

Furthermore, by reason of the maintaining of the level of the liquid in the reservoir more or less equal to the height of the uppermost location 23 of the wheel, when the valves 35 automatically open to vent the generated gas from the given gas collection spaces 21a and 21b, the hydrostatic pressure of the liquid in the reservoir 36 will force such generated gas through the corresponding gas delivery means by supplying a corresponding quantity of liquid thereto so as again to fill the wheel 2 more or less fully and up to such height of the uppermost location 23, thereby closing valves 35.

As to the gas recovery means for recovering the conversion gas from the gas delivery means, such may be in the form of the corresponding stationary axially extending cathode gas pipe 44 and anode gas pipe 45 as respective cathode gas recovery means and anode gas recovery means operatively adjacent the wheel 2. Suitably, cathode gas pipe 44 and anode gas pipe 45 have their respective recovery end means 46, 47 in opposed relation to each other and adjacent the opposed ends of the wheel 2, and their respective storage end means 48, 49 correspondingly remote from the wheel and leading to corresponding cathode gas storage tank means and anode gas storage tank means (not shown) for storage in the conventional manner.

Favorably, the cathode gas recovery end means 46 and the anode gas recovery end means 47 extend in opposed relation through the corresponding opposed end portions of the sub-shaft portions 3a and 3b of shaft 3, e.g. in a manner concentric with the shaft, and are operatively flow connected with the corresponding cathode gas pipes 33 and anode gas pipes 34 via the respective nipples 33b and 34b of the corresponding cathode gas joint 33a and anode gas joint 34a.

Since nipples 33b and 34b are operatively concentric to the horizontal axis of rotation A and thereby operatively concentric with the shaft 3 as well as the cathode gas recovery end means 46 and the anode gas recovery end means 47, rotary gas flow coupling means such as the conventional low friction rotary cathode gas flow coupling arrangement 50 and the low friction rotary anode gas flow coupling arrangement 51 may be correspondingly provided for flow connecting the nipples 33b and 34b with the cathode gas recovery end means 46 and the anode gas recovery end means 47, respectively. Such rotary gas flow coupling means are likewise suitably arranged in a manner concentric with the shaft 3 and the horizontal axis of rotation A.

Figure 5:
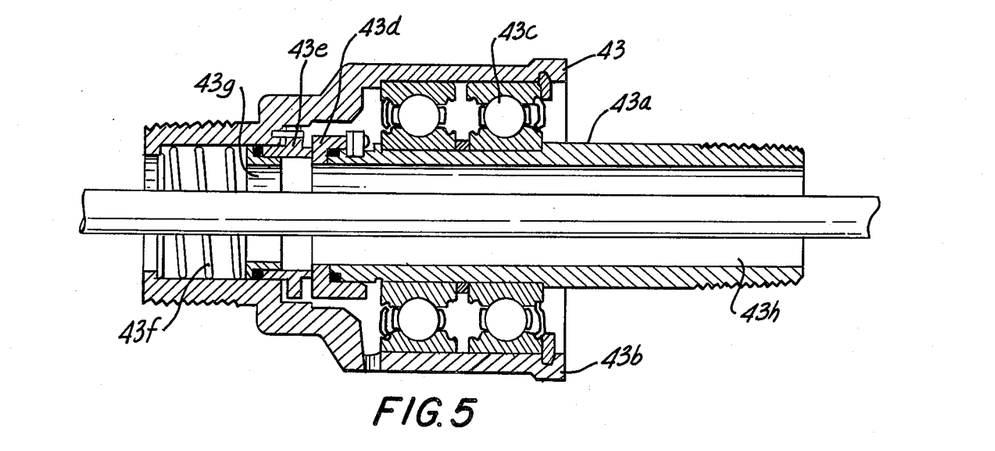
FIG. 5 is a schematic enlarged sectional partial view illustrating a concentric rotary coupling arrangement for feeding liquid to the apparatus and for recovering conversion gas from the apparatus.

It will be seen from FIG. 5 that the rotary liquid flow coupling means 43 may comprise a low friction rotary pressure joint of conventional design (e.g. Johnson "Free Wheeler" Rotary Pressure Joint, Johnson Corp., Three Rivers, Mich.), in which the hollow rotary nipple 43a, connected in turn to the corresponding rotating part of the wheel 2, e.g. hollow sub-shaft end portion 42, is rotatably mounted in the hollow stationary body 43b by ball bearings 43c, and is provided with a rotating carbon ring 43d on its inner end in sliding sealing contact with an opposed non-rotating carbon ring 43e urged axially into sliding sealing contact therewith by a compression coil spring 43f and follower ring 43g axially disposed in the hollow stationary body 43b. The hollow stationary body 43b is accordingly mounted on the feed pipe end portion 41 of the liquid feed pipe 40 (see FIG. 1).

As also shown in FIG. 5, the stationary cathode gas pipe 44 extends through the rotary liquid flow coupling means 43 in operative concentric relation thereto and to the horizontal axis of rotation A, being sufficiently inwardly spaced from the corresponding internal parts thereof to permit liquid flow outwardly thereof and along the annular path 43h defined between the sufficiently small outside diameter of the cathode gas pipe 44 and the inside composite diameter of the rotary liquid coupling means 43.

The very nature and vicinal disposition of these concentric flow paths advantageously permits heat exchange to occur between the incoming liquid in liquid feed pipe 40 and outgoing gas in cathode gas pipe 44 in counter current relation to each other for temperature adjustment and/or heat recovery as may be beneficial to the system and the overall operation of the instant apparatus 1, i.e. as where the appropriate portion of gas pipe 44 is made of heat conductive material.

It will be realized of course that the rotary gas flow coupling arrangements 50 and 51 may also each take the form of the rotary liquid flow coupling means 43 shown in FIG. 5, but preferably of smaller corresponding size and without any separate pipe concentrically disposed therewithin.

Moreover, any other rotary flow coupling means may be used for the liquid and/or the respective gas flows to and from the wheel 2, especially a low friction type rotary flow joint arrangement, as the artisan will appreciate, the only significant basic operative requirement being that free fluid flow therethrough without detrimental leakage should be permitted and without detracting from the overall energy producing rotational operation of the apparatus 1.

Figure 1:
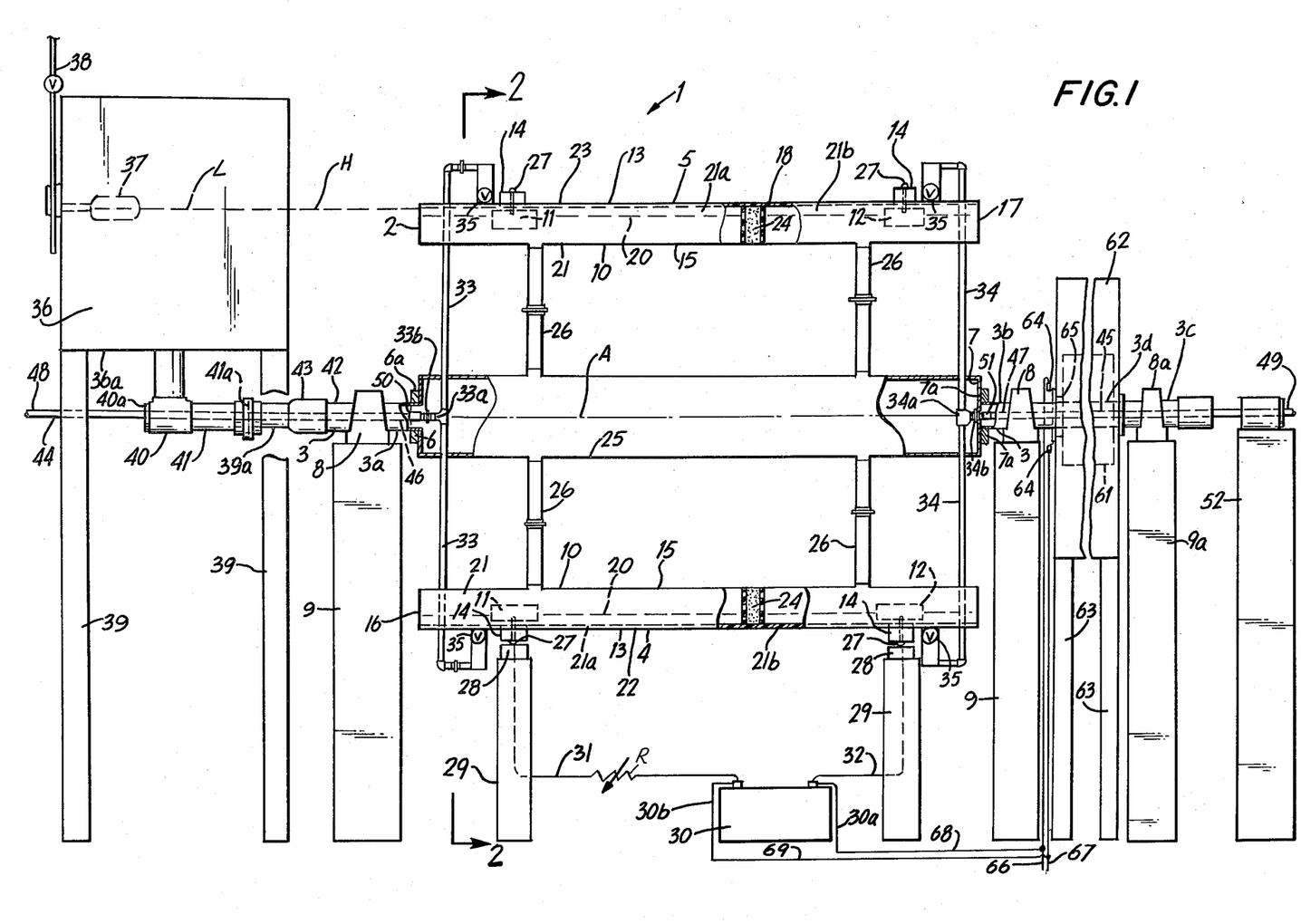
FIG. 1 is a schematic partial sectional view of an embodiment of an energy producing apparatus according to the present invention.

As can be seen from FIG. 1, cathode gas pipe 44 passes into liquid feed pipe 40 through a central opening in end cap 40a, such that gas pipe 44 is stationarily supported by end cap 40a in concentric spaced relation to the interior of feed pipe 40 yet by way of a sealed connection between gas pipe 44 and the opening in end cap 40a to prevent liquid leakage therethrough.

Optionally, a conventional internal spider 41a may be provided in the usual way within feed pipe end portion 41 to reinforce the stationary axial disposition of cathode gas pipe 44 and especially its recovery end means 46 within feed pipe end portion 41 and sub-shaft portion 3a, yet permitting open flow through the spider of liquid passing along the annular interior path between the internally disposed cathode gas pipe 44 and the externally or outwardly disposed feed pipe end portion 41 thereat.

On the other hand, since there is no need to feed liquid to the wheel 2 through the opposite hollow sub-shaft portion 3b, the latter may remain open at its remote end portion 3c and the anode gas pipe 45 may be suitably stationarily maintained by the appropriately positioned further support 52. The anode gas recovery end means 47, on the other hand, will be suitably coaxially maintained by the rotary anode gas flow coupling arrangement 51 at nipple 34b. In fact, nipple 34b is desirably mounted in end wall 7 of the hollow hub 25 so as to protrude outwardly therethrough, and the rotary anode gas flow coupling arrangement 51 is located thereat. In this way, the recovery end means 47 will be suitably supported by the rotary coupling arrangement 51 and the latter will in turn be supported by the nipple 34b mounted in end wall 7.

Naturally, nipple 34b will be sealed in a central opening in end wall 7 for rotation therewith about the horizontal axis A, so as to prevent liquid flow or leakage therethrough in like manner to the sealing of cathode gas pipe 44 in the central opening in end cap 40a of the liquid feed pipe 40. On the other hand, free gas flow outwardly through nipple 34b, rotary coupling arrangement 51 and recovery end means 47 will take place for the desired purposes.

It will be further appreciated that the cathode gas pipes 33 and anode gas pipes 34 correspondingly extend from the external periphery of the outer wall 13 of the wheel 2 at which the respective valves 35 are located back radially through outer wall 13, the zones 10, the inner wall 15 and thence through the hub wall to the interior of the hub 25 so as to reach the corresponding common joints 33a and 34a for axial flow through the corresponding rotary coupling arangements 50 and 51.

As the artisan will appreciate, the corresponding openings in the outer wall 13, the inner wall 15 and the wall of the hub 25 required for passage of such gas pipes 33 and 34 will be suitably sealed against liquid leakage therethrough, whereas the sealed fluid flow integrity of the gas pipes 33 and 34 will be maintained, just as in the case of the connection of cathode gas pipe 44 at the central opening in end cap 40a of the liquid feed pipe 40, the connection of sub-shaft portion 3a in the central opening in end wall 6 of hub 25, and the connection of nipple 34b in the central opening in end wall 7.

Furthermore, for added strength the non-rotatable connection between sub-shaft portion 3a and end wall 6 and the like connection between sub-shaft portion 3b and end wall 7 may include the corresponding conventional interconnecting end flanges 6a and 7a, as the artisan will appreciate.

Moreover, the axial location of the gas pipes 33 and 34 and of the liquid pipes 26 and spokes 26a may be selected as desired, but it is preferable to place the gas pipes 33 and 34 axially toward the opposed ends of the wheel 2 for easy access thereto and to avoid cluttering the middle axial portion of the wheel 2. The same is true of the liquid pipes 26 and spokes 26a, although the latter parts are preferably axially located so as to provide adequate support and reinforcement of the various elements of the wheel 2 and especially to bear the weight of the liquid in the annular tubular portion 18.

Although normally at least two axially spaced apart sets of spokes 26a should be provided, it will be appreciated that only one axial set of liquid pipes 26 will be required for distributing liquid to the successive zones 10. Of course, where it is not necessary or desired to maintain any cathode gas and anode gas separate from one another, only one gas delivery means and conjoint gas recovery means system need be provided.

In the latter instance, either the cathode gas delivery means and cathode gas recovery means may be omitted, or the anode gas delivery means and anode gas recovery means may be omitted, and the retained means used for delivery and recovery of the entire gas. Also, the diaphragm means 24 in such event would be likewise superfluous and could be omitted as well.

Consonant with the foregoing, the cathodes 11 and anodes 12 as well as the holders 14 and contact posts 27 may be similarly placed at any desired axial location, but will also preferably be located toward the axial end portions of the wheel 2 for the same reasons. In fact, the contact posts 27 or at least the external contacts thereof may be placed on the annular end walls 16 and 17 instead, in which case the brushes 28 will be similarly positioned for operative contact therewith, in conventional manner.

As the artisan will appreciate, operation of the valves 35, energization of the electrodes at the lower location 22, and maintaining of the liquid level in the reservoir 36, may all be carried out automatically in desired preselected and/or programmed manner. For example, the valves may be remotely controllable solenoid valves of conventional design, sensing means and/or programming means of electric, mechanical, electronic or other conventional type may be used respectively for their actuation and/or for energization of the electrodes correspondingly at the uppermost location 23 or lower location 22, as the case may be, and the float valve 37 may be replaced by similar remotely controllable flow adjustment valve means or the like in conjunction with such sensing means and/or programming means for their activation and/or energization, i.e. so as to accomplish more or less completely automatically the energy producing rotation of the instant apparatus and cognate method of operation thereof.

In accordance with an additional optional, yet preferred, feature of the present invention, the wheel 2 is operatively provided with armature coil means including an appropriate core and generator or alternator commutator means, plus brush means as current collection means for generating electric current directly during rotation of the wheel. For this purpose, the armature coil means including the core and commutator means are appropriately operatively arranged substantially in rotational balance on the wheel.

As shown in FIG. 1, the shaft 3 is operatively provided with armature coil means 61 on the intermediate extension sub-shaft portion 3d, between sub-shaft portion 3b and the sub-shaft remote end portion 3c, substantially in rotational balance thereon, and stationary field coil means 62 including corresponding magnetic pole pieces on appropriate supports 63 are operatively provided adjacent the sub-shaft portion 3d for induction coaction with the armature coil means for generating electric current during rotation of the wheel 2 and in turn of the composite shaft 3. Current collection means, e.g. low friction contact brushes 64, in conjunction with commutator means 65 are provided for collecting the generated current.

Such generator or alternator arrangement may be of conventional design and therefore is only shown schematically. Where a generator is contemplated a split ring commutator arrangement will be used whereas when an alternator arrangement is contemplated a commutator arrangement of two separate rings of the usual non-split ring type will be employed, as the artisan will appreciate, whereby to collect the current generated via the appropriate brushes.

The current collected via brushes 64 may be recovered via appropriate generator power lines 66 and 67 for desired storage or utilization, and optionally may be partially or even completely recycled, i.e. as direct current, via sub-lines 68 and 69 to recharge lines 30a and 30b for recharging the power source 30.

Of course, the recovered cathode gas and anode gas in cathode gas pipe 44 and anode gas pipe 45 may be electrochemically recombusted in a fuel cell (not shown) in conventional manner if desired, as earlier noted, so as to reconvert the same to additional electric energy, and optionally part or all of such energy may be conducted via such recharge lines 30a and 30b back to power source 30 to recharge the same, i.e. as needed.

In order to accommodate more efficiently the weight distribution of the armature coil means 61 on the shaft 3, and especially on the intermediate extension subshaft portion 3d, a supplemental support 9a provided with a low friction bearing 8a therefor, of like function and construction to supports 9 and bearings 8, is conveniently included in the arrangement.

Figure 3:
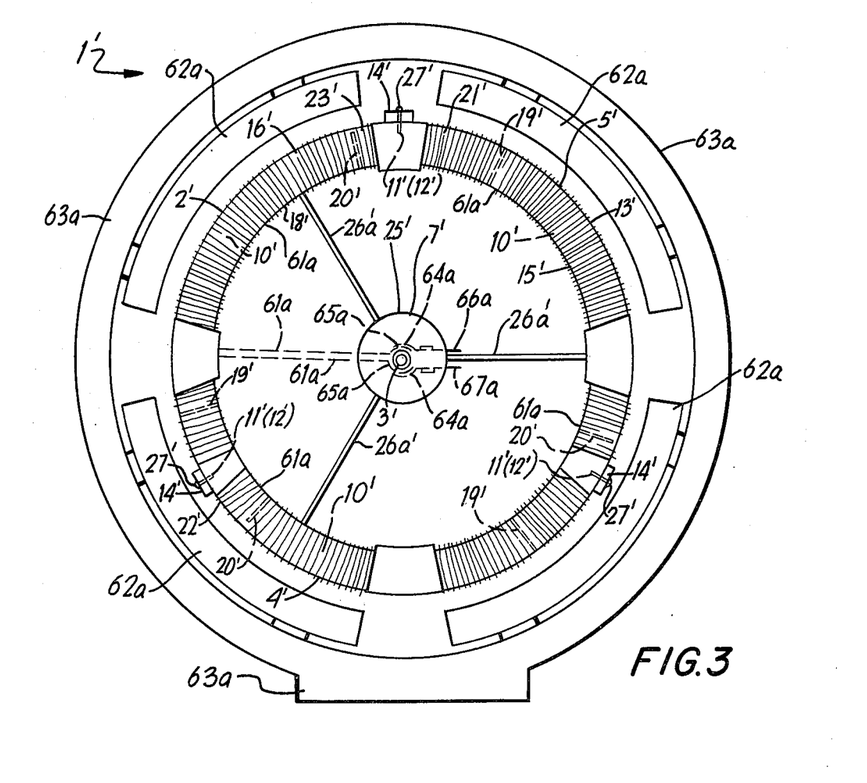
FIG. 3 is a schematic sectional view similar to FIG. 2 of another embodiment of the present invention, and showing the alternative inclusion of armature coil means on the apparatus.

In accordance with an alternative optional feature of the present invention, as schematically shown in FIG. 3, the wheel 2' of like parts generally to those of FIGS. 1 and 2, but here designated by prime (') reference numerals, itself may be operatively provided with armature coil means 61a circumferentially and substantially in rotational balance thereon, and stationary field coil means 62a may be operatively provided adjacent the wheel via supports 63a for induction coaction with the armature coil means 61a for generating electric current during rotation of the wheel. Current collection means, including commutator means 65a on the wheel 2' and stationary brushes 64a connected to power lines 66a and 67a, may be operatively provided in like manner for collecting the generated current.

Parts 61a to 67a operatively correspond to parts 61 to 67 and function in the same conventional manner, as the artisan will appreciate. Where the armature coil means 61a are provided on the wheel 2', it will be seen that preferably the same are located on the annular tubular portion 18' such that they do not interfere with the gas pipes 33' and 34', the holders 14' and contact posts 27', nor the liquid pipes 26' and spokes 26a', i.e. along the axial path of the coil means thereof across outer wall 13' and inner wall 15'.

Also schematically illustrated in FIG. 3 is the optional alternative feature of providing three cell zones 10' rather than two such zones as in the embodiment shown in FIGS. 1 and 2, with three corresponding full wall dividers 19' and conjoint partial wall dividers 20', plus three respective cathodes 11' and anodes 12' (not shown) together with the conjoint holders 14' and contact posts 27' therefor. The lower location 22' in this embodiment, considering the wheel 2' in relation to a clock face orientation for rotation in clockwise direction, will be roughly at about 8 o'clock for the zone 10' at which gas is to be generated, whereas the uppermost location 23' will still be at 12 o'clock for the zone 10' from which gas is to be delivered to the gas pipes 33' and 34', while the remaining inactive location of the third zone 10' will occupy roughly the arcuate span from about 1 to 5 o'clock.

Since only one third rather than one half revolution will occur in this three zone embodiment as compared to the two zone embodiment, in each successive operation, it is generally less preferred than the two zone embodiment.

Preferably, in the embodiment of FIG. 3, there will be three gas pipes 33' and three gas pipes 34', three cathodes 11' and three anodes 12' plus a corresponding number of respective holders 14' and contact posts 27', as well as six liquid pipes 26' and six spokes 26a', concordantly positioned at each axial end portion of the wheel 2' substantially in rotational balance and in substantially equally circumferentially distributed disposition in corresponding manner to the three substantially equally circumferentially distributed and rotationally balanced zones 10'.

More specifically, at one axial end portion of the wheel 2', three equidistant radial gas pipes 33' will be provided along with three equidistant radial liquid pipes 26' alternating concordantly with three equidistant radial spokes 26a'. In like manner, at the opposite axial end portion of the wheel 2', three concordantly radially positioned equidistant radial gas pipes 34' will be provided along with three concordantly radially positioned equidistant radial liquid pipes 26' alternating concordantly with three equidistant radial spokes 26a'.

The remaining parts of wheel 2' are provided in general accordance with the like parts of the wheel 2 of FIGS. 1 and 2, except of course that the generator system of parts 61 to 67 is omitted. Thus, the gas pipes 33' and 34' and their related parts as well as the liquid pipes 26' have been omitted from FIG. 3 for ease in illustrating the external orientation of the armature coil means 61a on the annular tubular portion 18' in relation to the field coil means 62a.

Preferably, annular tubular portion 18' should be composed of, or contain as a composite external layer or portion thereon, iron material serving as a rotor armature core for the armature coil means 61a consonant with stator magnet core field pieces in the stationary field coil means 62a, in the usual manner. Suitable conventional electrical insulation should also be provided on the wheel 2' and/or at its various bearings and supports so as to confine the electrically conductive parts to within the electrical system of the wheel for proper efficiency and safety.

The same is true of the wheel 2 in the embodiment of FIGS. 1 and 2.

Thus, all parts may be made of dielectric material such as suitably internally structurally reinforced plastic, or may be made of plastic lined and/or plastic coated metal, as the case may be, with suitable electrical insulation at the bearings and supports as well as at the legs and source pipe of the reservoir, such that the properly insulated circuit via the holders for the contact posts will be limited to such contact posts and the opposed electrodes of each zone in conjunction with the electrolyte containing liquid.

Figure 6:
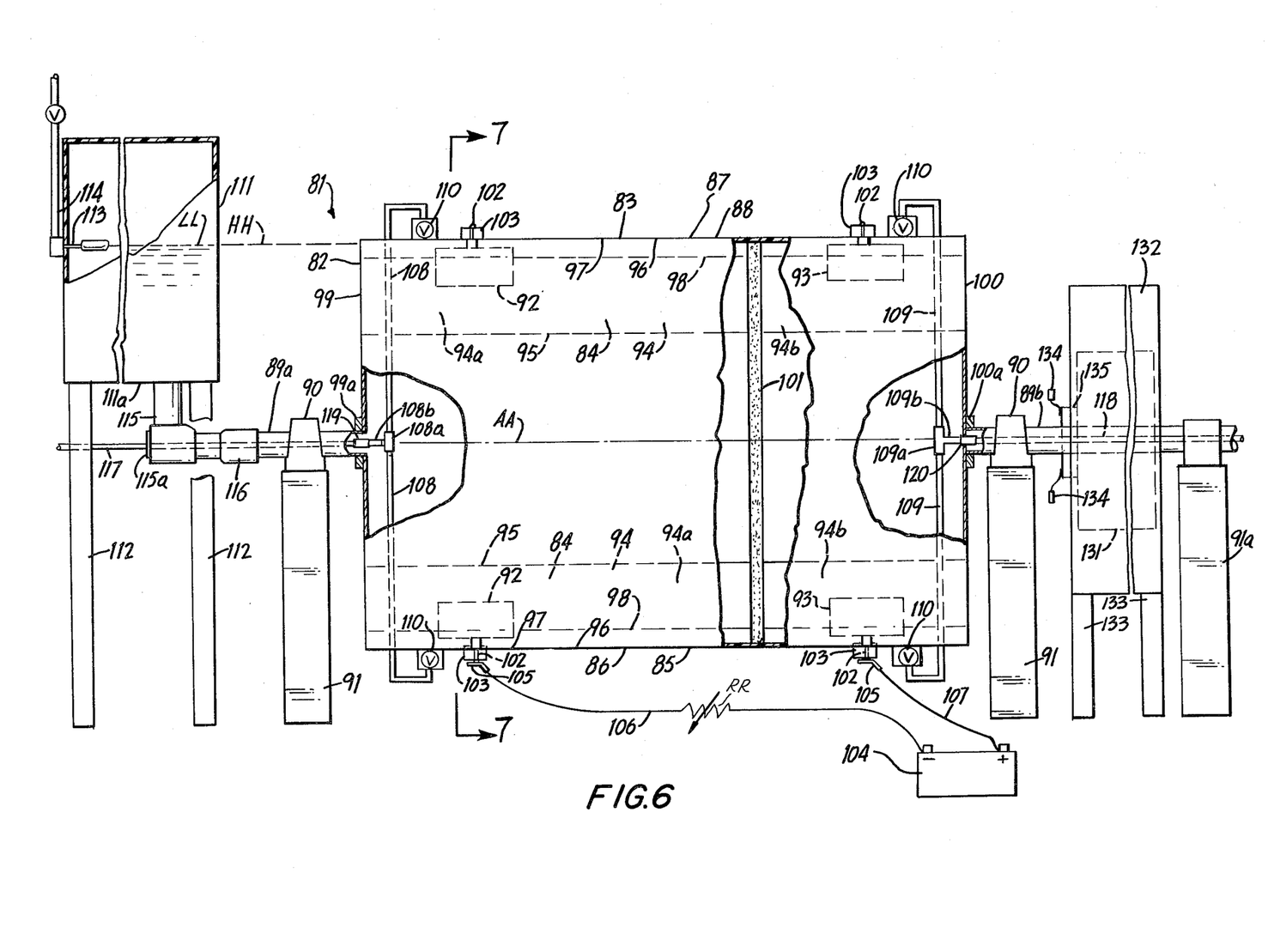
FIG. 6 is a schematic partial sectional view of a further embodiment of the energy producing apparatus according to the present invention.
Figure 7:
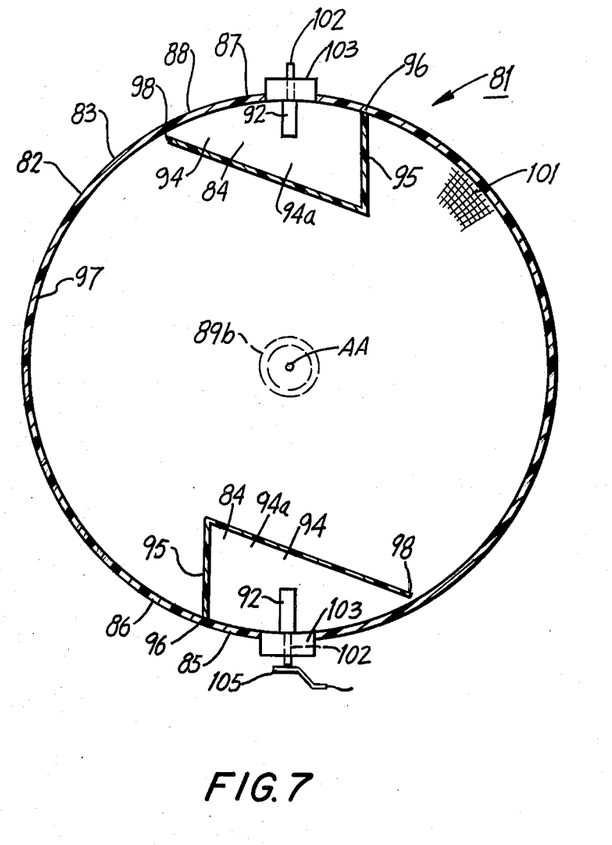
FIG. 7 is a schematic sectional view taken along the line 7—7 of FIG. 6.

With respect to the alternative embodiment of the energy producing apparatus 81 shown in FIGS. 6 and 7, the imbalance wheel 82 comprises an enclosed chamber means such as in the form of a hollow drum 83 containing two diametrically opposed electrochemical cell zones 84, one at a selective imbalance imparting lower location 85 in the lower half wheel portion 86 and the other at the substantially uppermost or neutral location 87 in the upper half wheel portion 88.

The wheel 82 is mounted via the hollow opposed end shafts 89a and 89b in bearings 90 carried by upright supports 91 for energy producing rotation about the horizontal axis AA to provide such lower half wheel portion 86 and upper half wheel portion 88, and is arranged along with its associated parts so as to be substantially in rotational balance. Thus, the two zones 84 are peripherally located and substantially equally circumferentially distributed or diametrically opposed and are arranged for electrochemical conversion of liquid to gas therein.

Each zone 84 has operatively opposed cathode means and anode means such as the cathodes 92 and anodes 93 of like or similar construction and characteristics to the electrodes in the embodiment of FIGS. 1 and 2, as well as operatively disposed imbalance imparting captive gas collection space means 94 for collecting corresponding conversion gas therein.

The gas collection space means 94 in each instance includes baffle means made up of the axially extending angular wall divider 95 connected at its base portion 96 to the interior surface 97 of the hollow drum 83 and spaced slightly at its free edge portion 98 from the adjacent portion of the interior surface 97 threat to permit limited liquid flow communication through the gap therebetween, together with the adjacent confining portions of the opposed end walls 99 and 100 of the drum 83 at the axial ends of the gas collection space means 94.

Thus, the baffle means of each zone 84 including the appropriately pocket shaped divider 95 and adjacent portions of the drum end walls 99 and 100 are operatively arranged for transmitting resultant gas lift thrust or torque of conversion gas thereagainst when at the lower location 85 for rotation of the wheel 82 to the uppermost location 87.

Liquid permeable gas separating diaphragm means 101, e.g. of the same type and construction, and for the same reasons, as the diaphragm means 24 of the embodiment of FIGS. 1 and 2, are desirably provided radially across the interior of the drum 83, so as to separate the corresponding gas collection space means 94 into a cathode gas collection space 94a adjacent the cathode 92 and an anode gas collection space 94b adjacent the anode 93.

Electrical conductor means such as in the form of contact posts 102 extending operatively through insulation holders 103 are arranged for selectively providing a circuit of current from a preferably rechargeable source 104 to the corresponding cathode 92 and anode 93 of each successive zone 84 when at the lower location 85. For this purpose, current supplying brush means such as in the form of the low friction slides or brushes 105 are operatively provided adjacent the wheel 82, whereby selectively to supply current from the source 104 via current lines 106 and 107 to the opposed cathode 92 and anode 93 of each successive zone 94 only when at the lower location 85.

Such electrical circuit system is designed and constructed in like manner to the corresponding system in the embodiment of FIGS. 1 and 2 and for the same purposes.

In the normal instance, where electrolysis of water containing an electrolyte is contemplated for electrochemical decomposition thereof into hydrogen gas at the cathode 92 and oxygen gas at the anode 93, and in like manner to the arrangement in the embodiment of FIGS. 1 and 2, the diaphragm means 101 will be selectively axially positioned to divide the corresponding zones 84 into a cathode gas collection space 94a which is twice the volume size of the anode gas collection space 94b for properly accommodating the resultant stoichiometrical volume quantities of these two gases produced in the particular zone 84, as the artisan will appreciate.

In like manner to the arrangement in the embodiment of FIGS. 1 and 2, gas delivery means such as in the form of radially extending cathode gas pipes 108 and anode gas pipes 109 are arranged for delivering conversion gas from the corresponding collection space means 94 of each successive zone 84 only when at the substantially uppermost location 87 to the corresponding common cathode gas joint 108a and common anode gas joint 109a in coaxial alignment with the horizontal axis AA for recovery respectively therefrom.

Suitable valves 110 are respectively provided at the peripheral entrance to the gas pipes 108 and 109 in the same manner and for the same reasons as valves 35 in the embodiment of FIGS. 1 and 2, and may be likewise constructed in accordance with the showing in FIG. 4. Thus, such valves 110 are operable for delivering gas from the corresponding collection space means 94 only when the corresponding zone 84 is at the uppermost location 87.

The liquid feed means for feeding liquid to the zones 84 advantageously constitutes the hollow end shaft 89a which is in open flow communication with the interior of the drum 83 via a central opening in the end wall 9 sealed by an end flange 99a structurally interconnecting the end shaft 89a and end wall 99 for common rotation with the drum.

Accordingly, liquid may be advantageously converted successively at the lower location 85 to gas in each zone 84, and the gas formed may be collected in the collection space means 94 thereof, thereby to displace a concordant volume of liquid therefrom and decrease the weight of the adjacent portion of the wheel 82 thereat in relation to the remainder thereof, for creating an imbalance in the wheel sufficient for energy producing rotation thereof in addition to delivery of conversion gas via the delivery pipes 108 and 109 for recovery.

Similarly to the arrangement in the embodiment of FIGS. 1 and 2, gas recovery means are operatively provided adjacent the wheel 82 for recovering the conversion gas from the gas delivery pipes 108 and 109, and liquid reservoir means are operatively provided adjacent the wheel for supplying liquid to the liquid feed means, i.e. to the hollow end shaft 89a.

Regarding the liquid reservoir means, such may comprise the liquid reservoir 111 supported via legs 112 at a suitable height and having liquid level flow adjustment means such as in the form of a conventional float valve 113 connected to a liquid source via source pipe 114 for maintaining the liquid level LL in the reservoir substantially equal to the height HH of the uppermost location 87 in the upper half wheel portion 88 of the wheel 82. Liquid reservoir 111 is in open flow communication with the liquid feed means as constituted by hollow end shaft 89a by an elbow pipe 115 extending from the underside 111a of the reservoir and flow connected to the end shaft 89a via the rotary liquid flow coupling means 116.

The rotary liquid flow coupling means 116 may be of the same type as in the embodiment of FIGS. 1 and 2, and as specifically indicated in FIG. 5. In fact, all of the parts of the reservoir 111, including the float valve 113, are designed and constructed to operate in the same manner as the corresponding parts in the embodiment of FIGS. 1 and 2.

Regarding the gas delivery means, the same may be likewise designed and constructed for operation in the same manner as the cognate parts in the embodiment of FIGS. 1 and 2, such as by providing a stationary cathode gas delivery pipe 117 and a stationary anode gas pipe 118 in coaxial relation with the opposed hollow end shafts 89a and 89b respectively, and also with the corresponding end nipples 108b and 109b of the common joints 108a and 109a, and by flow connecting the delivery pipe 117 to the end nipple 108b via the rotary cathode gas flow coupling arrangement 119 and in turn by flow connecting the delivery pipe 118 to the end nipple 109b via the rotary anode gas flow coupling arrangement 120. Rotary coupling arrangements 119 and 120 may be of the same type as rotary coupling arrangements 50 and 51 of the embodiment of FIGS. 1 and 2 (cf. FIG. 5).

Cathode gas recovery pipe 117 extends through a central opening in end cap 115a of elbow pipe 115 and is seated therein in sealed condition to prevent leakage thereat, and the inserted portion of pipe 117 extends coaxially within hollow end shaft 89a for operative connection at rotary cathode gas flow coupling arrangement 119 with the common joint 108a of pipe 108 so as to support operatively thereat such inserted portion of pipe 117.

On the other hand, the opposite hollow end shaft 89b is structurally interconnected with the closed end wall 100 via the reinforcing end flange 100a. Preferably, the anode gas common joint 109a is seated in a central opening in end wall 100 in sealed condition and such that its end nipple 109b protrudes through the end wall for convenient connection to the rotary anode gas flow coupling arrangement 120 to which the inserted portion of anode gas recovery pipe 118 coaxially within end shaft 89b is correspondingly connected. Such inserted portion of anode gas recovery pipe 118 is thereby similarly supported operatively thereat, whereas its remote end portion is supported on a separate support in a manner similar to the corresponding arrangement of the embodiment of FIGS. 1 and 2.

The recovery pipes 117 and 118 may be connected to suitable storage means or the like in the same manner and for the same purposes as the recovery pipes 44 and 45 of the embodiment of FIGS. 1 and 2.

In this instance also the energy producing rotation of the wheel 82 may be directly converted into electrical energy by operatively providing armature coil means 131 substantially in rotational balance on the end shaft 89b, along with stationary field coil means 132 operatively provided on upright supports 133 adjacent such shaft for induction coaction with the armature coil means for generating electric current during rotation of the wheel 82 and in turn of the end shaft 89b. Current collection means including low friction brushes 134 and commutator means 135 are also operatively provided for collecting the generated current. Such arrangement is designed and constructed in the same manner and for the same purposes as the cognate parts 61 to 65 in the embodiment of FIGS. 1 and 2.

It will be appreciated that in all embodiments, the various part may be interconnected so as to permit their ready dissembly for purposes of servicing and repair. Naturally, all parts are interconnected to provide an operatively sealed enclosed system. Normally, since the only internal operating parts generally contemplate the electrodes, holders, contact posts, diaphragm means, valves and rotary coupling means, and the portions of the shafts in the bearings, the appropriate construction of the apparatus may be designed to achieve ready access to such parts.

Although the various parts may be made of metal, preferably they may be made of plastic except as to those parts required or desired to be electrically or thermally conductive. Such plastic parts may be suitably reinforced in conventional manner, yet where metal parts are used they may be suitably coated by electrically or thermally insulating material such as plastic, except as aforesaid where they must be electrically conductive.

Naturally, the various supports for the shaft bearings and the gas recovery pipes, as well as the legs for the liquid reservoir, should all be provided with suitable electrical insulation.

In essence, the circuit including the contact posts, electrodes and liquid should be suitably electrically insulated, yet appropriately grounded, to prevent undue or undesired electrical energy loss through the inactive or inoperative portions of the system not required for the electrochemical conversion.

While the rotary coupling means, valves and shaft ends will normally be made of metal or include metal portions as appropriate, they may be suitably provided with insulation as noted above.

Furthermore, by reason of the confined and sealed path for the gas delivery means and conjoint gas recovery means, including the portion thereof within the wheel and hollow shaft ends, a safe and reliable system is provided which is relatively leak-proof and thus explosion-proof under normal operating conditions.

Of course, any other suitable form of gas delivery means and associated gas recovery means may be employed as and if desired, such as by recovering the gas directly peripherally from the wheel rather than axially at suitably peripherally disposed gas recovery means operatively flow connectable to the wheel for this purpose, e.g. at the uppermost location.

In operation, as regards all embodiments of the invention, current is selectively supplied from the source to the opposed cathode and anode of each successive cell zone only when at the selective lower location in the lower half wheel portion, and liquid thereat is electrochemically converted in situ in conventional manner in the presence of an electrolyte, e.g. sulfuric acid previously added in appropriate dosages to the liquid reservoir for adjusting and maintaining the desired concentration conventional for electrochemical decomposition of liquid such as water. Thus, the liquid such as water is electrochemically converted to gas such as hydrogen and oxygen in each zone successively at the lower location, and such gas is correspondingly collected in the corresponding collection space means thereof until an amount is accumulated therein which is just sufficient for creating an imbalance in the wheel and for energy producing rotation of the wheel.

As the wheel starts to rotate, the contact posts disengage from contact with the power source brushes, terminating automatically the electric current supply to the electrodes of such zone and in turn the electrochemical decomposition of the liquid thereat. The wheel stops rotating when the gas filled zone reaches the uppermost or neutral balance location at which time the power supply brushes engage the contact posts of the next successive zone to repeat automatically the electrochemical conversion operation of that zone at the lower location.

At the same time, upon reaching the uppermost location, the valves of the previous zone are drained of liquid (FIG. 4) and automatically open to permit the conversion gas to enter the corresponding delivery pipes from the collection space means of such zone under the pressure head of the liquid level in the reservoir which is in constant open flow communication with the entire enclosed chamber means of the given wheel. The gas eventually exits through the gas recovery means for storage, sale or reconversion to liquid with independent electrochemical production of electrical power as in a fuel cell in conventional manner.

Since the reservoir is in open flow communication with the entire enclosed chamber means of the given wheel, the portion of the liquid displaced from the particular zone by the accumulating gas during electrochemical conversion at the lower location will readily return in convenient manner in corresponding proportion to the reservoir, the latter serving as an appropriate expansion chamber for this purpose.

It should be noted in this regard that where the electrochemical conversion of the liquid in the given zone at the lower location results in the generation of heat, e.g. in the electrolysis of water, such that a portion of the liquid vaporizes, e.g. forms steam, the corresponding partial pressure representing thereby in the gas collection space means of such zone will contribute to the displacement of the vicinal liquid therefrom along with the partial pressure of the forming gas. Such liquid will progressively pass through the operatively narrow flow adjustment gap constituted by the spacing of the free end of the radial partial wall divider (FIGS. 1-3) or the free edge portion of the angular wall divider (FIGS. 6-7) against the hydrostatic liquid head in the reservoir into which a corresponding volume quantity of liquid rearwardly expands from the enclosed chamber means of the wheel, e.g. via the adjacent end of the wheel shaft.

Any such vaporized liquid, e.g. steam, remaining in the gas collection space means of the given zone when it reaches the uppermost location will not adversely affect the operation of the valves in the gas delivery pipes, since these are influenced by liquid not vapor, as the artesan will appreciate. This is evidenced by the conventional use of such valves on radiators in home heating systems to vent air trapped in the hot water environment within the pipe circuit therethrough. Of course, any vaporized liquid such as steam finding its way into the gas delivery pipe and in turn into the gas recovery pipe may be readily removed in a conventional liquid collection trap or liquid seal in the gas flow line (not shown) upon cooling condensation thereof.

It will be realized that the free end of the radial partial wall divider (FIGS. 1-3) and the free edge portion of the angular wall divider (FIGS. 6-7), as the case may be, will be appropriately positioned in relation to the angular arc defining the operative circumferential extent of the given gas collection space means, such that the chord represented by the gas-liquid interface at the lower location will not be disposed radially outwardly of or below such free end or free edge portion of the corresponding wall divider thereat. Absent liquid permeable gas separating diaphragm means or membrane means or other appropriate means thereat, as noted above, this would cause undesired escape of the accumulating gas into the remainder of the zone so as to negate the buoyancy effect of the gas for achieving imbalance imparting thrust or torque to the wheel.

Understandably, the gas space defined radially inwardly or above such gas-liquid interface in the given zone at the lower location, especially at the arcuately upwardly offset closed portion of the gas collection space means, will be potentially adequate in volume to provide imbalance imparting thrust or torque thereat sufficient to rotate the wheel in the desired direction to raise the given zone to the uppermost location before any accumulated gas has a chance to reach radially outwardly of or below such free end or free edge portion of the corresponding wall divider thereat or to escape therepast.

Optionally, the energy producing rotation of the wheel may be used directly to generate electric current, and such generated current may be conveniently collected and recovered. Some or all of such recovered generated current may be used, as aforesaid, to supply current to the cathode and anode of each successive zone when at the lower location, for example by recharging the power source for the system, as needed.

Where the electrochemical conversion is carried out under such conditions that heat is generated which would otherwise be lost through dissipation from the apparatus, e.g. by radiation from the wheel, or in the form of sensible heat carried off with the gas recovered, suitable means may be provided to prevent such dissipation, e.g. providing the wheel parts of thermally insulating material such as plastic or by covering such wheel parts with such thermally insulating material, whereas any sensible heat in the gas recovered may be suitably extracted by heat exchange contact, e.g. with the liquid from the reservoir passing in concentric countercurrent flow relation therewith through the appropriate hollow shaft portion of the wheel, or with similar heat extracting means in the conventional manner for use as waste heat or other recoverable and usable heat purpose.

Thus, any vaporized liquid such as steam finding its way into the gas delivery means and in turn the gas recovery means may be effectively cooled and condensed by suitable heat exchange contact with the incoming liquid from the reservoir in concentric countercurrent flow relation therewith, as noted above, or with other heat extracting means.

Should it be desired to provide liquid to the wheel at elevated rather than ambient temperature, this may be readily achieved by utilizing freely available solar energy or any other heat source to preheat the liquid in the conventional manner, e.g. prior to entering the liquid reservoir.

It will be further appreciated that other conventional automatic means may optionally be used if desired to actuate in programmed sequence the supply of electrical current to the electrodes in a given zone only when at the lower location and the termination thereof upon the start of the imbalance rotation, the operation of the valves to open for delivery of gas to the gas delivery means only when the given gas containing zone is at the uppermost location, and the feeding of liquid to the reservoir to maintain the desired liquid pressure head therein in proper relation to the height of the uppermost location of the wheel subject to reverse flow of liquid from the wheel back to the reservoir to achieve the above described expansion chamber effect.

It will be realized that with the use of present day available efficient electrodes for effecting electrochemical conversion of liquid such as water, relatively little energy is consumed in the successive generation of gas in each corresponding zone when at the lower location, especially considering that only that operationally minimum quantity of gas is needed which will cause the wheel to be sufficiently imbalanced as to rotate the gas containing zone to the uppermost location. This is fundamentally a self-determining point and the wheel need only overcome the frictional resistance of the shaft bearings, rotary coupling means and brushes in connection with the gas quantity otherwise just sufficient to impart a torque to the wheel to cause its periodic rotation to bring the gas in the zone at the lower location to the uppermost location.

Understandable, therefore, the shaft bearings, rotary coupling means and brushes will preferably be provided with as low a friction component as practicable, and the wheel including its associated rotating parts will be in as rotationally balanced a condition as practicable. Since the wheel will normally rotate very slowly and at most a half revolution where two zones are provided and only a third of a revolution where three zones are provided, its momentum will be arrested by contact of the contact posts of the next successive zone with the brushes at the lower location. Should any overrotation occur, the wheel will automatically rotate backwardly again to neutral balance point due to the counterbalancing effect of the gas in the gas containing zone, and the relative angular position of the divider 19 or 19', or of the closed end of the divider 95, to the remainder of the arcuate extend of the corresponding gas collection space thereat.

Naturally, since the imbalance wheel in effect represents a first class lever about the axis of rotation thereof as constituted by the shaft as fulcrum, the larger the diameter of the wheel in relation to the diameter of the shaft, the larger will be the mechanical advantage of the gas in the peripherally located zone at the lower location. The zones should be so positioned relative to the lowermost point in the wheel that gas will tend to collect at an angular point spaced sufficiently from the lowermost point to cause the wheel to rotate only in one and the same direction, as the artisan will appreciate.

Generally, since less liquid is present in the wheel in accordance with the central hub and peripheral annular tubular portion embodiment as compared with the hollow drum embodiment, greater efficiency will normally be achieved with the former as compared with the latter in terms of gas quantities needed to displace liquid and create the desired rotation imparting imbalance condition in the wheel, as the artisan will appreciate.

The energy for the electrochemical operation obviously may be drawn from any appropriate source, and especially from a conventional solar energy electrical conversion source. Thus, whereas solar derived electrical energy may be obtained in the day time or on sunny days, it may be utilized herein at night time not only to produce electrical energy by rotation of the wheel, or even purely mechanical energy in a constant periodic manner, but valuable commercial gases such as hydrogen and oxygen as well. These gases of course may also be electrochemically combusted to produce additional electrical energy as well.

Even if the overall energy consumed in operating the apparatus is not exceeded by the energy produced by rotation of the wheel, the resultant gases represent valuable commercial products, which together with the energy produced by the rotation, provide a lower overall cost of production of such gases than would be the case if the electrochemical conversion were carried out in a stationary installation in conventional manner rather than in the instant imbalance wheel arrangement.

In the event that the energy recovered directly from the operation is only to be provided as mechancial rotational energy, it will be realized that the appropriate rotating shaft of the wheel may be coupled in conventional manner by suitable low friction gearing to step up the angular extent of rotation. Thus, by gearing the wheel shaft operatively to a transmission shaft for rotating the latter at a multiple of the number of revolutions of the shaft of the wheel, every successive partial revolution of the wheel along an arc from the lower location to the uppermost location may cause the stepped up gearing of the transmission shaft therewith to effect rotation of the latter a corresponding multiple number of revolutions.

By operatively providing a generator or alternator or the like in turn in coupled rotational association with such transmission shaft, e.g. by mounting the armature coil means for rotation with such transmission shaft in a manner analogous to the mounting of the armature coil means on the wheel shaft or wheel itself as shown in FIGS. 1 and 6 or 3, as the case may be, each partial rotation of the wheel shaft or wheel will effect a concordant multiple number or rotations of such armature coil means for efficient production of electric current in this manner also.

The wheel in each instance must of course possess sufficient structural integrity to bear the load of all of its rotating parts plus the liquid therein.

Naturally, all appropriate parts of the overall arrangement regarding each of the embodiments should be properly grounded for safety, as the artisan will appreciate.

It will be appreciated that the foregoing specification and accompanying drawings are set forth by way of illustration and not limitation of the present invention, and that various modifications and changes may be made therein without departing from the spirit and scope of the present invention which is to be limited solely by the scope of the appended claims.

What is claimed is:

1. Energy producing apparatus comprising
an imbalance wheel adapted to be mounted for energy producing rotation about a substantially horizontal axis to provide a lower half wheel portion below such axis and an upper half wheel portion above such axis,
said wheel being substantially in rotational balance and defining at least two peripherally located and substantially equally circumferentially distributed electrochemical cell zones for conversion of liquid to gas,
each zone having operatively opposed cathode means and anode means and operatively disposed imbalance imparting captive gas collection space means for collecting corresponding conversion gas therein,
liquid feed means for feeding liquid to the zones,
electrical conductor means arranged for selectively providing a circuit of current from a source to the corresponding cathode means and anode means of each successive zone when at a selective imbalance imparting lower location in the lower half wheel portion, and
gas delivery means arranged for delivering conversion gas from the corresponding collection space means of each successive zone when at the substantially uppermost location in the upper half wheel portion for recovery therefrom,
whereby successively at such lower location to convert liquid to gas in each zone and collect the gas in the collection space means thereof, and thereby displace a concordant volume of liquid therefrom and decrease the weight of the adjacent portion of the wheel thereat in relation to the remainder thereof, for creating an imbalance in the wheel sufficient for energy producing rotation thereof in addition to delivery of conversion gas via the delivery means for recovery.

2. Apparatus according to claim 1 wherein the gas delivery means includes valve means operable for delivering gas from the corresponding collection space means only when the corresponding zone is at the uppermost location.

3. Apparatus according to claim 1 wherein the corresponding collection space means includes baffle means operatively arranged for transmitting resultant gas lift thrust of conversion gas thereagainst when at the lower location for rotation of the wheel to the uppermost location.

4. Apparatus according to claim 1 wherein liquid permeable gas separating diaphragm means are provided in each zone for separating the gas collecting space means into a cathode gas collection space adjacent the cathode means and an anode gas collection space adjacent the anode means.

5. Apparatus according to claim 1 wherein the wheel is operatively provided with armature coil means substantially in rotational balance thereon for generating electric current during rotation of the wheel.

6. Apparatus according to claim 1 wherein the wheel includes enclosed chamber means having a central hub and a peripherally located annular tubular portion outwardly spaced from the hub and containing the zones.

7. Apparatus according to claim 6 wherein the hub is hollow, the liquid feed means are flow connected with the hub, and the hub is in common flow connection with each of the zones, the zones being in flow connection with each other only through the hub.

8. Apparatus according to claim 1 wherein the wheel includes enclosed chamber means in the form of a hollow drum containing the zones.

9. Apparatus according to claim 1 wherein two zones are provided in substantially diametrically opposed and rotationally balanced disposition.

10. Apparatus according to claim 1 wherein at least three zones are provided in substantially equally circumferentially distributed and rotationally balanced disposition.

11. Apparatus according to claim 1 wherein the wheel is carried on a shaft for rotation about such horizontal axis, gas recovery means are operatively provided adjacent the wheel for recovering conversion gas from the gas delivery means, and liquid reservoir means are operatively provided adjacent the wheel for supplying liquid to the liquid feed means.

12. Apparatus according to claim 11 wherein the shaft is hollow, the gas recovery means include end means extending through the shaft, and the end means are operatively flow connected with the gas delivery means via rotary gas coupling means concentric with the shaft.

13. Apparatus according to claim 12 wherein the gas delivery means include valve means operable for delivering gas from the corresponding collection space means only when the corresponding zone is at the uppermost location.

14. Apparatus according to claim 11 wherein the shaft is hollow and has an end portion which forms an end portion of the liquid feed means, and the liquid feed means are operatively flow connected with the liquid reservoir via rotary liquid coupling means on the shaft end portion.

15. Apparatus according to claim 14 wherein the liquid reservoir is provided with liquid level flow adjustment means for maintaining the liquid level in the reservoir substantially equal to the height of the uppermost location in the upper half wheel portion of the wheel, and the liquid feed means are in open flow communication with the liquid reservoir.

16. Apparatus according to claim 14 wherein the gas recovery means include end means extending through the shaft, and the end means are operatively flow connected with the gas delivery means via rotary gas coupling means concentric with the shaft and including a rotary gas coupling arrangement adjacent to the rotary liquid coupling means.

17. Apparatus according to claim 11 wherein liquid permeable gas separating diaphragm means are provided in each zone for separating the gas collection space means into a cathode gas collection space adjacent the cathode means and an anode gas collection space adjacent the anode means, the gas delivery means include separate corresponding cathode gas delivery means and anode gas delivery means for each cell and separate corresponding cathode gas valve means and anode gas valve means operable for delivering corresponding cathode gas and anode gas from the corresponding collection space only when the corresponding zone is at the uppermost location, the gas recovery means include separate corresponding cathode gas recovery means and anode gas recovery means, and the cathode gas recovery means are operatively flow connected with the cathode gas delivery means and the anode gas recovery means are operatively flow connected with the anode gas delivery means.

18. Apparatus according to claim 17 wherein the shaft is hollow and has an end portion which forms an end portion of the liquid feed means, the liquid feed means are operatively flow connected with the liquid reservoir via rotary liquid coupling means on the shaft end portion, the cathode gas recovery means and anode gas recovery means include corresponding end means respectively extending through the opposed end portions of the shaft, the end means of the cathode gas recovery means are operatively flow connected with the cathode gas delivery means via rotary cathode gas coupling means concentric with the shaft, and the end means of the anode gas recovery means are operatively flow connected with the anode gas delivery means via rotary anode gas coupling means concentric with the shaft, one of the rotary gas coupling means being adjacent to the rotary liquid coupling means.

19. Apparatus according to claim 18 wherein the liquid reservoir is provided with liquid level flow adjustment means for maintaining the liquid level in the reservoir substantially equal to the height of the uppermost location in the upper half wheel portion of the wheel, and the liquid feed means are in open flow communication with the liquid reservoir.

20. Apparatus according to claim 11 wherein the wheel is operatively provided with armature coil means circumferentially and substantially in rotational balance thereon, field coil means are operatively provided adjacent the wheel for induction coaction with the armature coil means for generating electric current during rotation of the wheel, and current collection means are operatively provided for collecting the generated current.

21. Apparatus according to claim 11 wherein the shaft is operatively provided with armature coil means substantially in rotational balance thereon, field coil means are operatively provided adjacent the shaft for induction coaction with the armature coil means for generating electric current during rotation of the wheel and in turn of the shaft, and current collection means are operatively provided for collecting the generated current.

22. Apparatus according to claim 11 wherein current supplying brush means are operatively provided adjacent the wheel for selective successive conductive circuit connection with the electrical conductor means on the wheel for selectively providing current from a source to the opposed cathode means and anode means of each successive zone when at the lower location.

23. Apparatus according to claim 22 wherein rechargeable power source means are provided in operative circuit connection with the current supplying brush means.

24. Method of operating an energy producing apparatus according to claim 11 which comprises selectively supplying current from a source to the opposed cathode means and anode means of each successive zone when at the selective lower location in the lower half wheel portion, electrochemically converting liquid in the presence of an electrolyte to gas in each such zone successively thereat and collecting the corresponding conversion gas in the corresponding collection space means thereof sufficiently for creating an imbalance in the wheel and for energy producing rotation of the wheel, and delivering conversion gas from the corresponding collection space means of each such successive zone when at the substantially uppermost location in the upper half wheel portion for recovery therefrom.

25. Method according to claim 24 wherein the energy producing rotation of the wheel is used to generate electric current and such generated current is collected and recovered.

26. Method according to claim 25 wherein such recovered generated current is used at least in part to supply current to the opposed cathode means and anode means of each successive zone when at the lower location.

27. Method according to claim 24 wherein the conversion gas is recovered from the wheel.

* * * * *